United States Patent Office 3,069,227
Patented Dec. 18, 1962

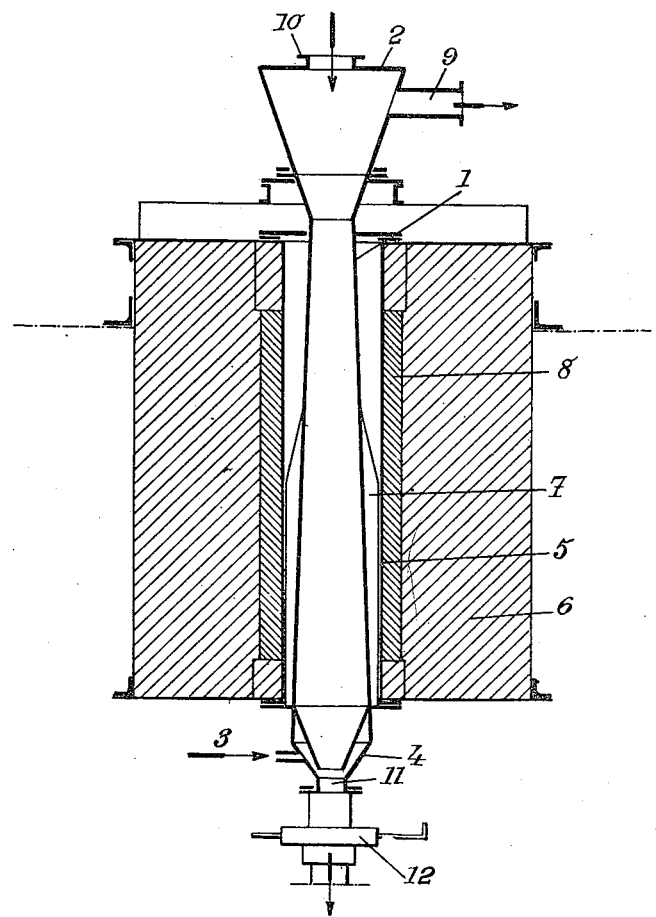

3,069,227
METHODS AND APPARATUS FOR THE OBTAINMENT OF URANIUM FLUORIDE
Paul Vertès, Vert-le-Petit, Jean Sauteron, Paris, and Maurice Delange, Saint-Ouen, France, assignors to Commissariat à l'Energie Atomique, Paris, France, a state administration
Filed June 15, 1955, Ser. No. 515,746
Claims priority, application France June 18, 1954
1 Claim. (Cl. 23—14.5)

The present invention relates to methods and apparatus for the obtainment of uranium fluoride, by reaction between uranium oxide and gaseous hydrofluoric acid, which reaction, has a tendency to produce swelling of the mass in reaction.

The object of our invention is to provide a method and apparatus which are better adapted to meet the requirements of practice than those applied at the present time.

For this purpose, according to our invention, the material to be treated, which consists of uranium oxide, is agglomerated into elements of relatively small dimensions.

Other features of our invention will become apparent in the course of the following description of a preferred embodiment thereof with reference to the accompanying drawing, given merely by way of example and which is a diagrammatic vertical sectional view of an apparatus for the treatment of uranium oxide by hydrofluoric acid.

As it is known, uranium fluoride is obtained by means of the following exothermic reaction:

$$UO_2 + 4HF = UF_4 + 2H_2O$$

Such a reaction is not difficult to carry out in a laboratory in small amounts and in discontinuous fashion. But industrial production of uranium fluoride, in particular in continuous fashion, involves very serious difficulties which, up to the present time, have made it impossible to use this reaction for practical purposes. The chief difficulty lies in the swelling of uranium oxide in the course of its transformation into fluoride, because this swelling stops the flow of gases and generally causes clogging of the apparatus.

According to our invention, in order to obviate this drawback, we subject the starting material, that is to say uranium oxide, and more especially uranous oxide $UO_2$, to a preliminary treatment increasing its density by agglomeration under pressure.

Experience teaches that it is thus possible not only to limit swelling so that a gas stream can keep flowing through the small intervals existing between the elements or particles of agglomerated material, but also to maintain a good reactivity owing to the fact that said elements have a high porosity so that gas can flow through their mass.

This result is due to the fact that the material to be agglomerated, that is to say uranous oxide $UO_2$, is generally obtained, after different treatment operations, the last of which is the reduction of uranic oxide $UO_3$ into uranous oxide $UO_2$, in the form of very small crystals of high reactivity. Now the agglomeration treatment preserves these conditions so that the agglomerated product remains porous and is easily attacked by gases, even in the mass of the agglomerated elements.

Of course, agglomeration should be performed in such manner that said porous elements are of small dimensions, and in particular that their thickness is small. Advantageously, these elements are in the form of pellets which, in particular and more especially in the case of a treatment apparatus as will be hereinafter described, have a diameter of 6 mm. and a thickness of 3 mm. Of course, according to the circumstances, other forms of the agglomerated elements may be used, and in particular we might make use of spherical grains or the like.

We will now describe an apparatus for applying our method.

This apparatus includes at least one substantially vertical tube 1, preferably slightly conical, with its larger diameter at the bottom. This tube receives the pellets of agglomerated material at the top, for instance through a hopper 2, whereas hydrofluoric acid gas is introduced at the bottom at 3. The apparatus further includes heating means for starting the reaction and cooling means for the evacuation of the excess of calories due to the exothermic character of said reaction.

The steam of hydrofluoric acid gas, which is preferably preheated, is introduced at 3, for instance through a circular casing 4 the opening of which is directed downwardly so as to avoid clogging thereof by the product.

Heating in order to start the reaction is obtained for instance by an electrical resistor, illustrated at 8 on the drawing, the whole being surrounded by a heat insulation 6.

The means for evacuating the excess of calories may be constituted by a plurality of fins 7 which facilitate heat exchanges owing to the circulation of an air (or other fluid) stream, preferably adjustable, between tube 1 and an outer tubular casing 5. It is thus possible to keep the temperature of the reaction at any suitable value.

The apparatus further includes the following parts:

On the one hand, means for evacuating gases (such as steam and an excess of hydrofluoric acid), such means consisting for instance in a tube 9 branching off from hopper 2, And on the other hand, means for adjusting the circulation of the material to be treated.

Such means may be arranged in such manner that the circulation of said material is continuous, the pellets entering constantly at 10 and issuing constantly in the state of uranium fluoride at the bottom of tube 1 at 11.

The circulation of the pellets may also be discontinuous and in this case successive charges are introduced into the apparatus at 10 and suitable quantities of uranium fluoride are removed at intervals at 11.

In this last case, which corresponds to the apparatus illustrated by the drawing, we provide at the inlet and at the outlet, closure means such as shown at 12, preferably of the sliding type, which are made suitably gas-tight, for instance by means of joints of a plastic material such as that called "Teflon."

Of course, all the elements of the apparatus are made of a material which is capable of resisting the effects of the reactions, for instance of nickel or Monel metal.

Advantageously, the upper part of the apparatus is subjected to a slight suction, the drop of pressure taking place by the passage of the gas stream through the reactive mass being sufficient to obtain in the vicinity of the lower discharge means 12, a pressure substantially equal to atmospheric pressure or above it. In this way, any inflow of air through this discharge means is made impossible. Such an air inflow would oxidize the fluoride, thus causing the pellets to burst by increase of their specific volume and producing a rise of temperature which would be detrimental of a good operation of the apparatus.

The pellets which are introduced at the top of the apparatus at 10 are prepared in any suitable agglomerating apparatus and for instance under a pressure of for instance 100 kg. per sq. cm.

This apparatus works as follows.

Successive amounts of pellets of uranous oxide are introduced at suitable time intervals at the top of the apparatus and corresponding amounts of uranous fluoride resulting from the reaction are withdrawn at the bottom also at suitable intervals. These operations are conducted in such manner that the mass present in the apparatus remains practically constant and the ranges of temperature remain also substantially constant therein. Of course, at the beginning of the operations, the treatment has been started by means of heating means 8, the action of which is stopped after a suitable time.

By way of indication, an apparatus including a tube of a height equal to 1.20 m. and of a diameter of 90 mm. at the top and 150 mm. at the bottom, makes it possible to obtain from 12 to 15 kg. of uranous fluoride per hour.

The method and apparatus according to our invention have many advantages as compared with those existing at the present time, in particular as follows:

It is possible to obtain a good continuity of operation owing to the fact that the pellets are sufficiently compact, thus preventing swelling, and therefore avoiding any possible clogging of the apparatus; the treated material (that is to say uranium fluoride) is still in the form of pellets at the outlet of the apparatus.

A high yield can be obtained, because the reactivity of uranous oxide is maintained due to the porosity of the pellets through the mass of which hydrofluoric acid gas can flow.

Owing to this porosity, it is possible to adjust the reactions without difficulty.

Finally, it is easy to separate the gases resulting from the reactions (steam, etc.,) which, on the contrary, is difficult when it is endeavoured to cause hydrofluoric acid gas to react upon a powdery mass of uranous oxide.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claim.

What we claim is:

The method of continuous production of uranium fluoride which comprises continuously feeding, at the top end of an at least substantially vertical reactor having a cross section slightly greater at the bottom than at the top, uranous oxide $UO_2$ in the form of pellets agglomerated under a pressure of at least 100 kg./sq. cm. which pellets travel downwardly through said reactor without being disintegrated by swelling during the reaction, continuously passing a stream of gaseous hydrofluoric acid upwardly through said reactor, and continuously collecting uranium fluoride in the form of pellets at the bottom thereof.

References Cited in the file of this patent

UNITED STATES PATENTS

| | | |
|---|---|---|
| 1,530,493 | Hall | Mar. 24, 1925 |
| 2,456,935 | Fisher | Dec. 21, 1948 |
| 2,548,876 | De Jahn | Apr. 17, 1951 |
| 2,656,267 | De Marchi | Oct. 20, 1953 |
| 2,768,872 | Klein et al. | Oct. 30, 1956 |

OTHER REFERENCES

Friend: Textbook of Inorganic Chemistry, vol. VII, part III, page 291 (1926), Charles Griffin & Co., London.

Liddell: Handbook of Nonferrous Metallurgy, Principles and Processes, pages 409–428 (1945), McGraw-Hill Book Co.

Chemical Engineering, vol. 61, pages 156–160 (January 1954).

The Chemistry of Uranium, part I, Joseph J. Katz and Eugene Robinowich, 1st edition, McGraw-Hill Book Co., N.Y., 1951, page 361.